United States Patent [19]

Evans

[11] 4,411,165
[45] Oct. 25, 1983

[54] POWER TRANSMISSION UNIT WITH INFINITE SPEEDS

[76] Inventor: Lyle B. Evans, 9135 SW. Summerfield Ct., Tigard, Oreg. 97223

[21] Appl. No.: 322,950

[22] Filed: Nov. 19, 1981

Related U.S. Application Data

[63] Continuation-in-part of Ser. No. 235,417, Feb. 17, 1981, abandoned.

[51] Int. Cl.³ .............................................. F16H 21/42
[52] U.S. Cl. .......................................... 74/63; 74/30
[58] Field of Search ................ 74/29, 30, 63, 69, 393, 74/394, 793

[56] References Cited

U.S. PATENT DOCUMENTS

| | | |
|---|---|---|
| 1,435,838 | 11/1922 | Gill . |
| 2,069,007 | 1/1937 | Fontana .............................. 74/393 |
| 2,183,193 | 12/1939 | Husson .................................... 74/30 |
| 3,087,355 | 4/1963 | Bassereau . |
| 3,490,299 | 1/1970 | Binner . |
| 3,750,485 | 8/1973 | Blakemore ........................ 74/125.5 |
| 3,913,749 | 10/1975 | Wyers . |

FOREIGN PATENT DOCUMENTS

| | | |
|---|---|---|
| 625053 | 2/1936 | Fed. Rep. of Germany . |
| 340544 | 7/1904 | France . |
| 437830 | 5/1912 | France . |
| 527598 | 10/1921 | France . |
| 766638 | 7/1934 | France . |
| 282671 | 2/1931 | Italy . |
| 345007 | 12/1936 | Italy . |
| 60215 | 7/1934 | Sweden . |
| 381833 | 10/1973 | U.S.S.R. . |
| 715863 | 2/1980 | U.S.S.R. . |

Primary Examiner—Lawrence J. Staab
Attorney, Agent, or Firm—James D. Givnan, Jr.

[57] ABSTRACT

A rotor of the transmission is journaled within a stationary housing and is driven by rotatable gear rack components therein. A pinion gear drives the gear rack components by sequentially meshing with spaced apart gear racks on each component. A speed selector assembly positions the pinion gear relative the rotor axis and includes a gear train to couple the gear to a power input shaft. Speed changes between the input shaft and a rotor driven output shaft are effected by positioning of the pinion gear away from the rotor axis resulting in the gear rack components moving eccentrically within the rotor. A cam structure acts on each gear rack component to control meshing of the gear racks on the component with the pinion gear. Each of the pairs of gear racks on a modified form of the transmission are resiliently mounted on their respective gear rack assemblies. Rails of each gear rack assembly rotate about stationary but adjustable cam rings of the transmission. The gear rack assemblies include bearing elements at their ends for engagement with the transmission rotor.

18 Claims, 13 Drawing Figures

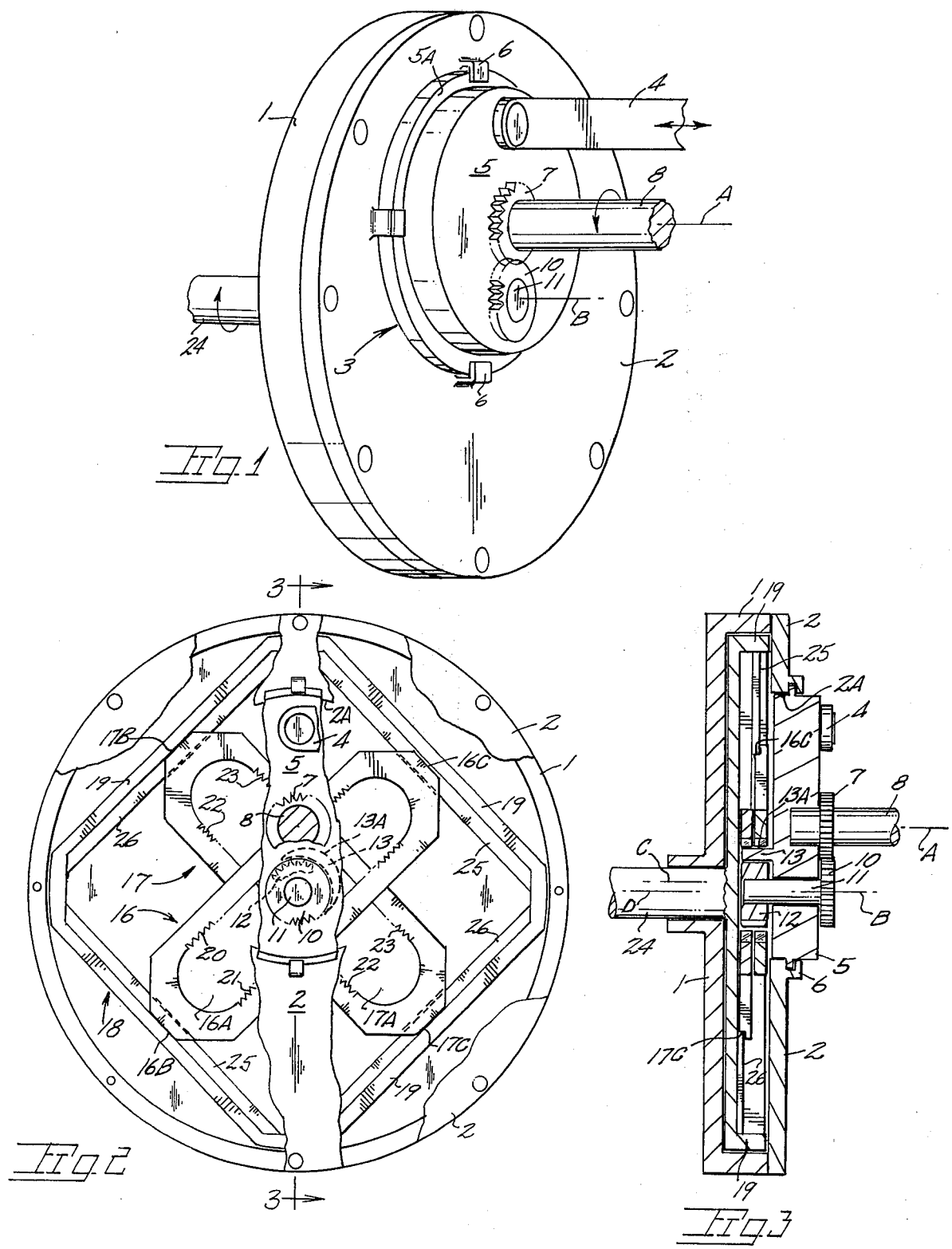

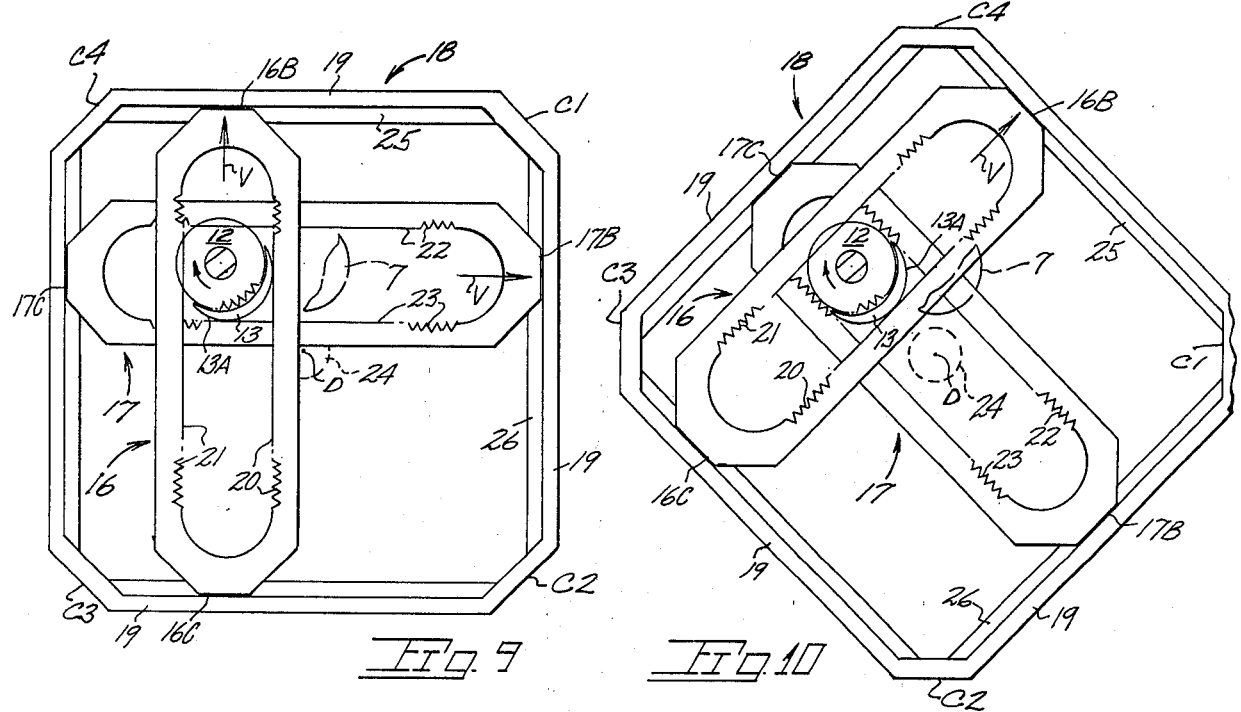
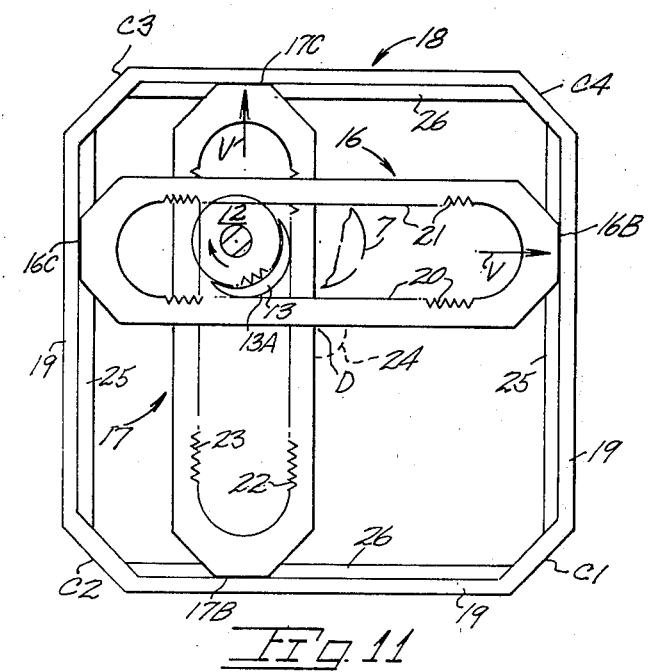

POWER TRANSMISSION UNIT WITH INFINITE SPEEDS

BACKGROUND OF THE INVENTION

An earlier filed copending parent application, now abandoned was filed in the U.S. Patent and Trademark Office on Feb. 17, 1981 under Ser. No. 235,417 and disclosed subject matter in common with a portion of the subject matter described in this continuation-in-part application.

The present invention pertains generally to power transmission units of the type having a speed reducing capability.

Typical gear equipped transmissions utilize chordally enmeshing gears with selective gear trains providing multiple fixed ratios. Speed changing in such transmissions necessarily results in an interruption of power output during gear shifting. Additionally, the restricted chordal tooth meshing inherent between driving and driven circular gears in conventional transmissions requires that the gears be of substantial length for adequate tooth strength resulting in conventional transmissions being of considerable size and weight. Further, typically transmissions utilize gear trains where speed reduction is by means of axially displaceable gears which require synchronizing means further complicating the transmission mechanism. Known transmissions, particularly of the automotive type, add substantially to vehicle weight to hinder operating economy.

SUMMARY OF THE PRESENT INVENTION

The present invention is embodied within a power transmission unit of compact design and providing infinite speeds between ratio extremes.

The present transmission includes multiple rotating gear rack components which are powered by a driver such as a pinion gear. Said gear rack components impart rotation to a combination rotor and output shaft. Linear motion imparted to the gear rack components by the driver gear is translated into rotary motion of the rotor by reason of the rack components being rotatably confined by the rotor and acting along vectors offset from the rotor axis. Speed changes to the rotor and output shaft result from selectively positioning of the pinion gear toward or away from the rotor axis with maximum speed reduction occurring at the extreme of pinion gear displacement from the rotor axis.

The gear rack components are each of elongate, open frame-like configuration each having a pair of opposed rack gears oppositely spaced from the pinion gear. A crescent shaped cam structure serves to isolate one rack gear of the pair from the pinion gear while simultaneously causing its companion rack gear of the pair to rotate into pinion engagement. Accordingly, positioning of the pinion relative the axis of rotor rotation accomplishes a speed change by reason of the pinion enmeshing with a lessor or greater number of rack teeth.

In a preferred embodiment the rack gears are preferably spring mounted in a manner permitting relative movement therebetween for meshing purposes. The gear rack assembly ends are each bearing equipped. Further, the cam structure includes bearing rings.

Important objectives of the present transmission unit include the transmission of uninterrupted power transfer between driving and driven shafts during speed changes throughout a range of infinite speeds; the provision of an infinite speed transmission for a wide range of uses yet having substantially fewer parts than limited ratio, variable speed transmissions; the provision of an infinite speed transmission unit of substantially less weight and complexity than known transmissions; the provision of a power transmission unit benefitting from increased tooth surface contact of gear components resulting from the utilization of pinion and rack gears in distinction to the meshing of circular gears; the provision of resiliently mounted rack gears for purposes of enhancing meshing of same with the pinion gear of the transmission; the provision of replaceable rack gears detachable from their respective gear rack assembly; the provision of circulating bearing members at the gear rack assembly ends to reduce friction between the hokes and the rotor; the provision of replaceable bearing rings on which the rails of each bearing assembly ride during rotation.

Of the known prior art, U.S. Pat. No. 3,490,299 is of interest only for the reason that it discloses pinion gears each in continuous engagement with a set of rack gears. Reciprocal motion imparted to the input set of rack gears is translated into rocking lever motion to drive a second or output set of rack gears which drive pinion gears in place on an output shaft. Clutches, mechanically or electrically actuated, permit overrunning of the pinions on their supporting shafts during rack gear passage in an idling direction.

BRIEF DESCRIPTION OF THE DRAWINGS

In the accompanying drawings:

FIG. 1 is a perspective view of the present power transmission unit shown on a reduced scale;

FIG. 2 is a front elevational view of FIG. 1 with fragments broken away for purposes of illustration;

FIG. 3 is a vertical section of FIG. 2 taken along line 3—3 thereof;

FIGS. 7, 8, 9, 10 and 11 are schematic views of the rotor and gear rack components of the present transmission unit with the pinion gear positioned for maximum speed reduction of the rotor and its output shaft;

FIG. 13 is a vertical sectional view taken approximately along line 13—13 of FIG. 12 with portions of the gear rack assemblies shown in phantom lines.

DETAILED DESCRIPTION OF THE PREFERRED EMBODIMENT

Figure 4:
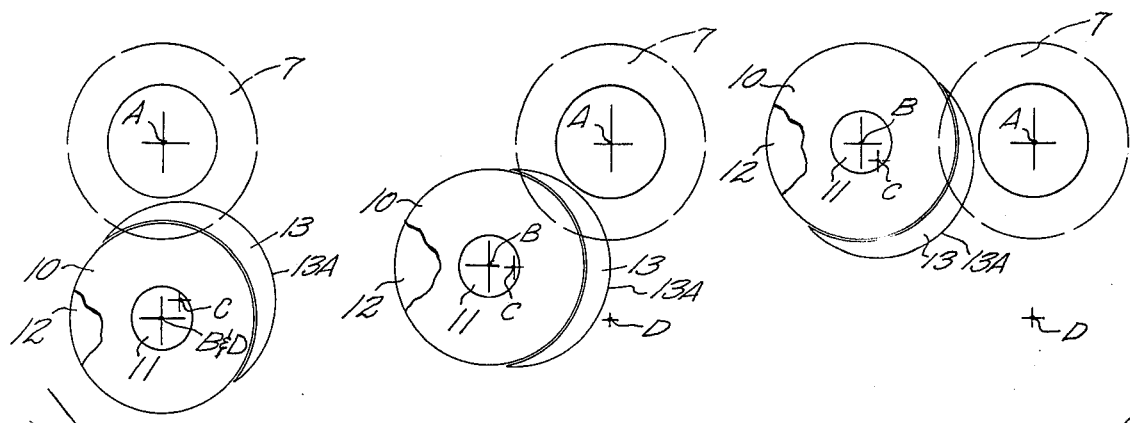
FIG. 4 shows schematic views of the pinion gear and associated gear components positioned respectively left-to-right for providing a one-to-one ratio, a speed reduction ratio and a greater speed reduction ratio all shown with the gear rack components deleted for illustrative purposes.
Figure 5:
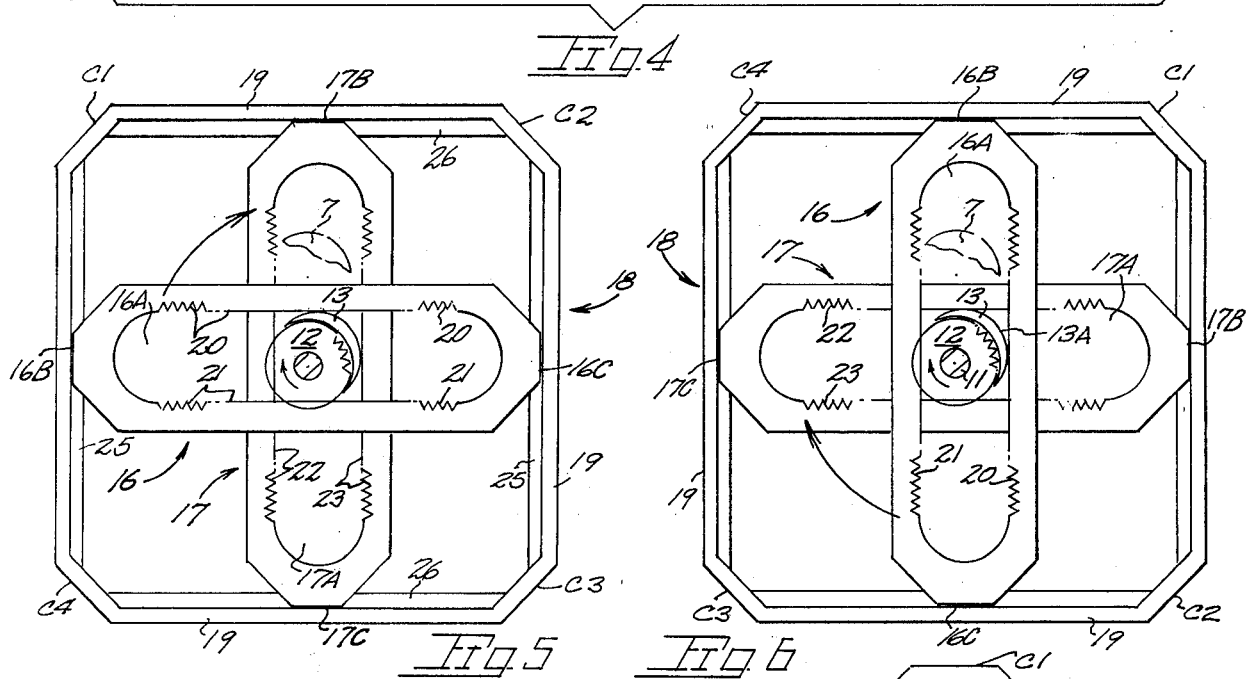
FIG. 5 is a schematic view of the rotor of the present transmission with gear rack components in place therein with the driver pinion gear located so as to effect a one-to-one drive ratio.
Figure 6:
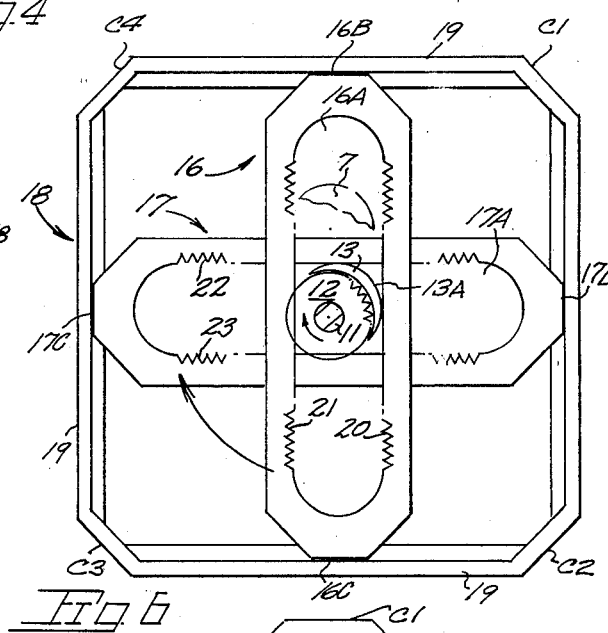
FIG. 6 is a view similar to FIG. 5 but with the gear rack components and rotor rotated clockwise through ninety degrees.
Figure 7:
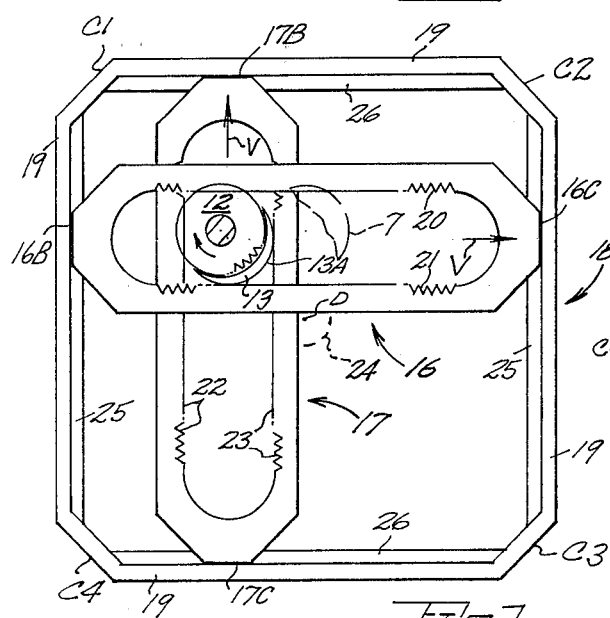
Figure 8:
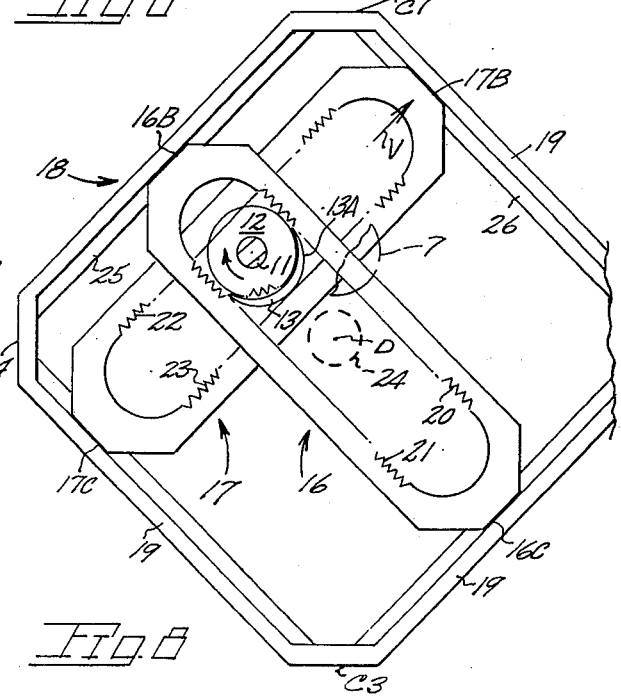

With continuing attention to the drawings, the reference numeral 1 indicates a transmission case or housing of circular configuration closed by a cover plate 2. Said housing is suitably charged with a quantity of lubricant and with mounting means (not shown) for securement to a support such as a vehicle frame component.

Adjustably supported within a cover plate opening 2A (FIG. 3) is a speed selector assembly generally at 3. The selector assembly includes a gear carrier body at 5 flanged at 5A on which flange retainers 6 act to permit adjusted rotational movement of body 5 about an axis at A in response to movement of a speed control member at 4.

Gear means associated with the speed selector assembly include a drive gear 7 on a power input shaft 8. In mesh with drive gear 7 is a driven gear 10 on a shaft 11 suitably journaled within the positionable carrier body. Affixed to the inner end of shaft 11 interiorly of housing 1 is a pinion gear 12 (FIG. 3). From the foregoing it will be seen that upon arcuate positioning of selector body 5 gears 10 and 12 will be positioned about axis A.

Additionally carried by gear carrier body 5 and positionable therewith is a cam structure 13 located within housing 1 and partially circumposed about pinion gear 12. A cam outer surface is at 13A. Said cam surface acts on later described gear rack components to constrain same for rotational movement into and out of arcuate mesh with pinion gear 12. Cam 13 overlies approximately one-half of the pinion gear periphery.

Axis B constitutes the axis of rotation for driven gear 10, shaft 11 and pinion gear 12 and is offset from axis A and positionable thereabout upon adjusted movement of carrier body 5. Similarly, cam 13 is positionable about axis A during arcuate positioning of the carrier body. Cam surface 13A is formed about an axis C offset from axis B of pinion gear 12.

First and second gear rack components are cruciformly disposed and indicated respectively at 16 and 17 each shown as being of elongate plate shape and each defining a lengthwise extending opening 16A–17A. Paired gear racks thereon at 20–21 and 22–23 are spaced to receive therebetween both pinion gear 12 and cam 13.

Each gear rack component is slidably confined at its ends 16B–16C and 17B–17C within and contributes to driving a rotor plate of pan shape generally at 18 and having a perimetrical wall 19. Said rotor drives a power output shaft at 24. Rotor corners C1 through C4 are indicated in FIGS. 5 through 11 for purposes of following rotor rotation.

With further attention to the gear rack components, the opposed or companion gear racks at 20–21 each extend substantially the length of component opening 16A. Similarly companion gear racks at 22 and 23 on component 17 extend the length of opening 17A. The gear racks of each pair are oppositely spaced from one another a distance permitting full engagement of one gear rack with pinion gear 12 while the remaining gear rack of the pair slidably engages a midpoint along cam surface 13A. Cam structure 13 accordingly constrains each gear rack component 16 and 17 to revolve about axis C of cam surface 13A during which rotation the cam surface acting on one gear rack of the pair with the pinion gear teeth engaging the remaining gear rack of the pair.

During driving of the gear rack components by pinion 12, forces are imparted to the components of wall 19 of rotor 18 by the wall abutting ends 16B–16C and 17B–17C of the rack components. When the transmission is in a speed reducing configuration, the rack component ends reciprocate partially along segments of the rotor walls. To stabilize the rack component ends 16B–16C and 17B–17C during such travel opposed wall shoulders at 25 and 26 are provided. If so desired, the gear rack component ends may be equipped with suitable bearings as later described for friction reducing purposes.

In a direct or one-to-one drive relationship (FIGS. 2, 3, 5 and 6) between input shaft 8 and a rotor carried output shaft 24, the pinion gear is coaxial with an axis D of rotor 18. In this instance no relative movement occurs between gear rack components 16 and 17, pinion gear 12 and the rotor.

Upon pinion 12 being repositioned by the speed control assembly into a typical speed reducing position as shown in FIGS. 7 through 11, force vectors act lengthwise per the arrows along each gear rack component which vectors are offset from rotor axis D and hence impart rotation to the rotor. As the vectors approach intersecting rotor axis D the imparted forces diminish. During one complete rotation through 360 degrees of a gear rack component both gear racks thereon 20–21 or 22–23 will have rotated into mesh with certain pinion gear teeth.

The operation of same in a non-speed reducing configuration will be initially set forth. As per FIGS. 2, 5 and 6, powered pinion gear 12 is disposed coaxially with axis D of rotor 18. Accordingly, rotating pinion gear 12 will be in static mesh with one or both gear rack components in a fixed relationship therewith. In this instance, the rotational speed of pinion gear 12, gear rack components 16 and 17 and rotor 18 is uniform. Movement of gear rack components 16 and 17 is rotational only with no relative movement between the gear rack components and the rotor.

Speed reduction of output shaft 24 relative input shaft 8 is effected by movement of speed control body 5 by control member 4. Pinion gear 12 is thereby positioned about axis A so as to be offset from rotor axis D. Forces are applied singly by the pinion to one of the two gear racks of each gear rack component 16 or 17 and are applied along a vector V offset from rotor axis D to impart clockwise rotation to the rotor per FIGS. 7 through 11. In the extreme displaced position of pinion gear 12 (from rotor axis D) maximum speed reduction is effected. The pinion gear so positioned will mesh with substantially all of the teeth of each gear rack.

Control member 4 may be manually positioned or coupled to torque sensing means with provision made for automatic positioning of the control member in response to changing torque loads on the transmission. Further, the present transmission may be used in series with one or more additional like transmissions for greater speed reduction.

Figure 12:
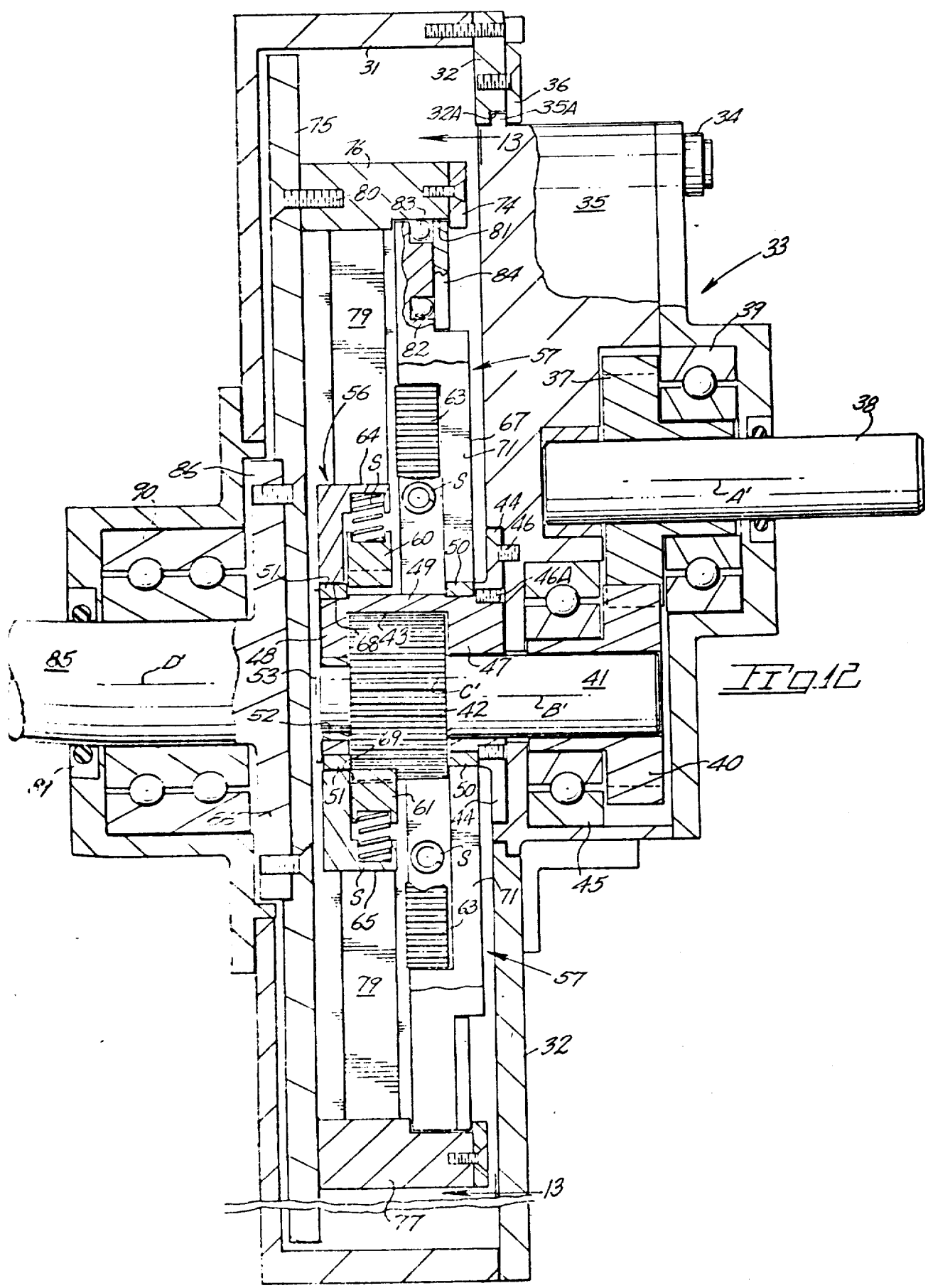
FIG. 12 is a vertical sectional view similar to FIG. 3 but on an increased scale with fragmented gear rack assemblies.

With regard to FIGS. 12 and 13 wherein a preferred version of the transmission is shown, the transmission case 31 is closed by a circular cover plate 32 to define a chamber receiving a quantity of lubricant. A speed selector assembly generally at 33 is rotatably confined within a cover plate opening 32A. The selector assembly includes a gear carrier body 35 flanged at 35A for retention by a retainer ring 36 permitting arcuate movement of the body about an axis A'. A drive gear 37 of the selector assembly is carried by a power input shaft 38 with said gear in mesh with a driven gear 40 on a shaft 41 at the opposite end of which is fixed a pinion gear 42. Gears 40 and 42 and their common shaft 41 rotate about an axis B' and are positionable about axis A' during arcuate positioning of the speed selector assembly 33 by a control arm 34. Power input shaft 38 is journaled within a bearing assembly 39 while driven shaft 41 is suitably journaled within a bearing assembly at 45.

Additionally carried by speed selector assembly 33 and positionable about axis A' is a cam structure 43 disposed in close proximity to pinion gear 42. Cam structure 43 is secured to gear carrier body 35 by a ring 44 and fasteners as at 46 and locking screws 46A. The cam structure includes circular portions 47 and 48 and an intermediate crescent shaped portion 49. The cam structure further includes bearing rings 50 and 51 inset within shouldered areas of circular cam portions 47 and 48. Said rings are disposed about an axis C' which moves with adjusted movement of the speed selector assembly. The crescent shaped portion constitutes a bridge between the circular cam portions and overlies approximately 180 degrees of pinion gear 42. Pinion gear 42 at all times has several teeth radially offset from bearing rings 50–51. Bearing rings 50 and 51 provide surfaces about which rail edges of later described gear rack assemblies ride during assembly rotation. The outer end of pinion carrying shaft 41 is supported within a bushing 52 within the outermost end of the cam structure. A retainer washer 53 confines said bushing and the outermost bearing ring 51.

First and second gear rack assemblies generally at 56 and 57 are disposed at right angles to one another in the manner earlier described with each of said assemblies having a pair of spaced apart gear racks thereon at 60 and 61 and at 62 and 63. The racks of each pair are oppositely disposed in a parallel manner with the earlier described pinion gear and cam structure therebetween. The gear racks 60–61 and 62–63 are resiliently supported by spiral springs S which are confined within aligned recesses formed in the underside of the gear racks and in parallel rail members 64–65 and 66–67 of each gear rack assembly. The rail members of each assembly are of right angle section with inwardly facing load bearing edges at 68–69 and 70–71 which rotatably ride on the bearing rings of the earlier described cam structure. Keepers (not shown) on the rail member ends overlie the ends of each gear rack and confine the racks for limited movement in a single plane relative their respective rail member. Normally the gear rack and its rail member are coplanar. The rack supporting springs S permit each gear rack to yield during meshing with pinion gear 42 in those isolated instances where initial gear rack tooth and pinion tooth contact is at the tooth apices. By resiliently mounting each gear rack, the same may yield in this instance thus minimizing tooth wear.

In place on a circular rotor plate 75 within housing 31 are opposed wall structures 76–77 and 78–79 secured thereto as by recessed fasteners 80. Said wall structures are symmetrically disposed on rotor plate 75 with respect to rotor plate axis D' in opposing, parallel pairs with each pair confining a gear rack assembly which is in endwise sliding contact therewith. As typically shown in FIGS. 12 and 13 the wall structures are each shouldered as at 81 to slidably receive the associated rack assembly end. A plate 74 is secured along each wall structure. Each rack assembly end is machined to provide an endless raceway 82 occupied by circulating bearing elements 83 shown as ball bearings. A closure plate as at 84 is suitably secured to the gear rack assembly end for bearing retention. Wall structure 76, and specifically shouldered portion 81 thereof, constitutes a bearing surface on which the rack assembly acts.

Circular rotor plate 75 is carried by a transmission output shaft 85 flanged at 86 for the reception of plate fasteners at 87. A bearing housing 88 is suitably secured to the transmission housing and retains a seal 89 and a bearing assembly 90 for said output shaft. Circular rotor plate 75 and output shaft 85 are concentric with an axis D'.

In FIG. 13, cam axis C' and rotor axis D' are aligned as the transmission input and output shafts are set in a one-to-one ratio with no relative movement between the gear rack assemblies nor the rotor structure. Arcuate rotation of speed selector assembly 33 will result in pinion gear 42 being displaced about axis A' in the manner described in conjunction with the first described transmission unit. Positioning of pinion gear axis B' to the extreme (remote from rotor axis D') will result in maximum speed reduction ratio between input and output shafts. Such positioning of pinion gear 42 away from rotor axis D' will cause said gear to mesh with a greater number of gear rack teeth during the momentary gear rack engagement to, in effect, provide a transmission "low gear" ratio. As the pinion gear is adjustably positioned toward rotor axis D' the input shaft-output shaft ratio decreases with a one-to-one ratio effected when the pinion gear axis is in substantial alignment with rotor axis D'. In this instance no relative movement occurs between the gear rack assemblies nor between same and the rotor structure.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

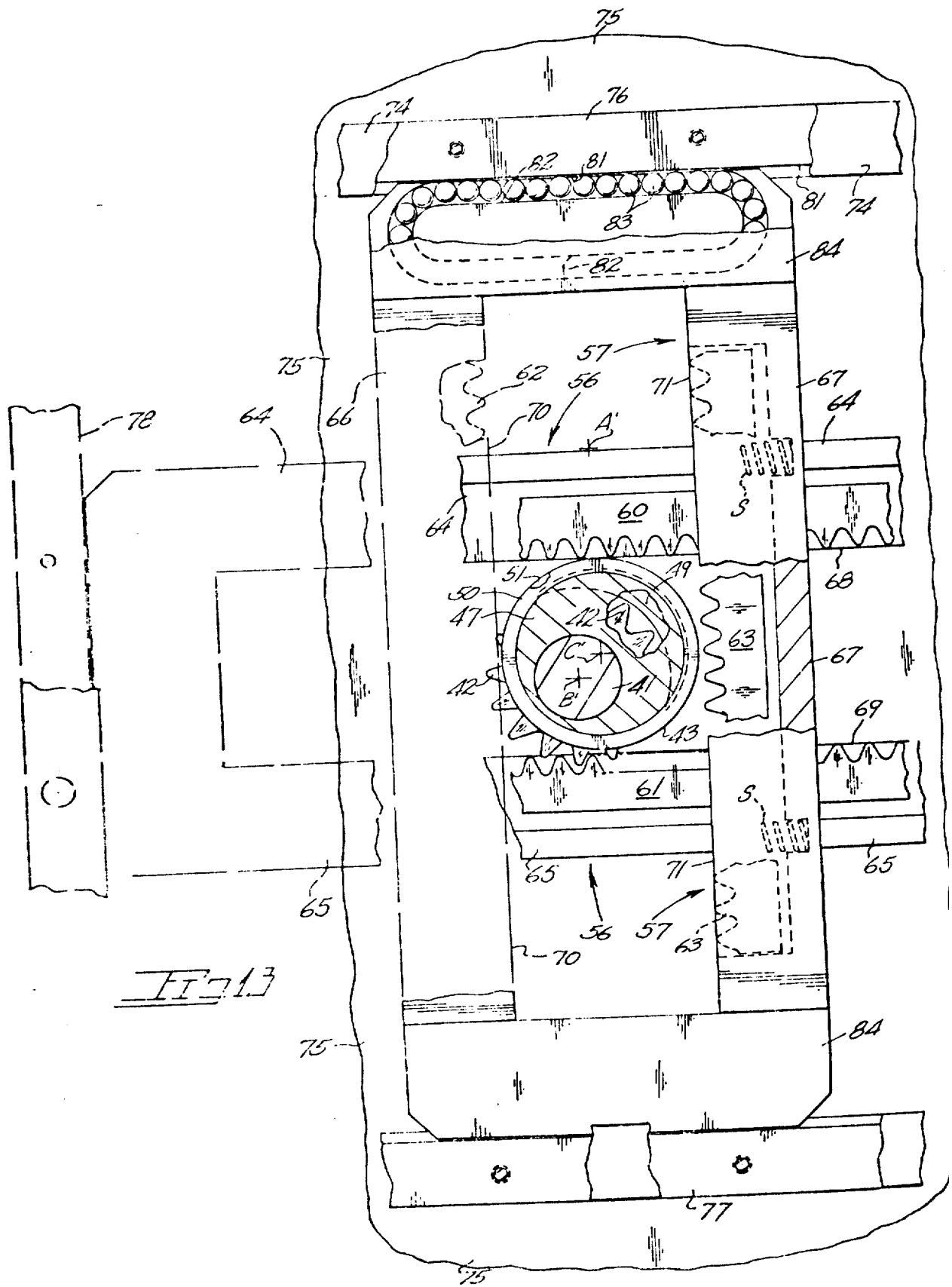

I claim:

1. A power transmission unit comprising,
   a housing,
   a power input shaft,
   a speed selector assembly adjustably carried by the housing and including gear means, said gear means including a pinion gear powered by said input shaft,
   a rotor,
   a power output shaft driven by said rotor,
   gear rack components within said housing and in driving engagement with said rotor,
   said pinion gear adapted to impart motion to the gear rack components,
   a cam structure movable with the speed selector assembly and acting on said gear rack components, and
   said speed selector assembly positionable so as to locate said pinion gear proximate the axis of rotor rotation, said speed selector additionally positionable to locate the pinion gear away from the axis of rotor rotation whereat the pinion gear sequentially drives the gear rack components along vectors offset from the axis of rotor rotation whereby a speed reduction is effected between the power input and output shafts.

2. The power transmission unit claimed in claim 1 wherein said speed selector assembly includes a control member.

3. The power transmission unit claimed in claim 2 wherein said speed selector assembly is rotationally positionable by said control member about the axis of said power input shaft.

4. The power transmission unit claimed in claim 2 wherein said gear rack components each include opposed gear racks, said pinion gear and said cam structure interposed between the opposed gear racks of each gear rack component.

5. The power transmission unit claimed in claim 4 wherein said gear rack components are each in endwise movable engagement with said rotor.

6. The power transmission unit claimed in claim 5 wherein said cam structure acts on each gear rack component to simultaneously isolate one gear rack thereon from said pinion gear while constraining the remaining gear rack of the gear rack component for travel into mesh with the pinion gear.

7. The power transmission unit claimed in claim 6 wherein said gear rack components reciprocate within said rotor during speed reducing operation of the transmission.

8. The power transmission unit claimed in claim 7 wherein the gear rack components are in cruciform relationship to one another, the axis of said pinion gear at all times located proximate the intersection of said components, the distance of said intersection from the rotor axis in direct proportion to gear rack component displacement relative the pinion gear.

9. In a power transmission unit having a housing, a power input shaft and a power output shaft, the improvement comprising, gear rack components in said housing.

a rotor coupled to the output shaft and driven by said gear rack components an adjustable speed selector assembly on said housing and including a pinion gear powered by said input shaft and acting on said gear rack components to impart motion to same, said pinion gear positionable toward and away from the rotor axis, said gear rack components constrained by said rotor for rotary motion about said pinion gear, cam means acting on said gear rack components to control meshing of the gear rack components with the pinion gear, and said speed selector assembly operable to position said pinion gear with respect to the rotor axis of rotation with positioning of the pinion gear remotely from said axis effecting a reduction in output shaft speed.

10. The improvement claimed in claim 9 wherein said gear rack components each include spaced apart opposed gear racks, each of said gear racks adapted for rotational alternating engagement both with said pinion gear and said cam means during rotary movement of the gear rack components about the pinion gear when said gear is offset from the rotor axis.

11. A power transmission unit comprising,
a housing,
a power input shaft,
a speed selector assembly adjustably carried by the housing and including gear means, said gear means including a pinion gear powered by said input shaft,
a rotor
a power output shaft driven by said rotor,
gear rack assemblies within said housing and in endwise driving engagement with said rotor,
said pinion gear adapted to impart motion to the gear rack assemblies,
a cam structure movable with the speed selector assembly and acting on said gear rack components, and
said speed selector assembly positionable so as to locate the rotational axis of said pinion gear proximate the axis of rotor rotation, said speed selector additionally positionable to locate the pinion gear axis away from the axis of rotor rotation whereat the pinion gear sequentially drives the gear rack assemblies along vectors offset from the axis of rotor rotation whereby a speed reduction is effected between the power input and output shafts.

12. The power transmission unit claimed in claim 11 wherein said speed selector assembly includes a control member.

13. The power transmission unit claimed in claim 12 wherein said speed selector assembly is rotationally positionable by said control member about the axis of said power input shaft.

14. The power transmission unit claimed in claim 12 wherein said gear rack assemblies each include opposed gear racks, said pinion gear and said cam structure interposed between the opposed gear racks of each gear rack assembly, said gear rack assemblies each further including rail members each of which carries one of said gear racks, resilient means carried by each of said rail members and yieldably supporting the gear rack carried thereby.

15. The power transmission unit claimed in claim 14 wherein said rotor includes wall structures, said gear rack assemblies each in endwise movable engagement with said rotor.

16. The power transmission unit claimed in claim 15 wherein said cam structure acts on each gear rack assembly to simultaneously isolate one gear rack thereon from said pinion gear while constraining the remaining gear rack of the gear rack assembly for travel into mesh with the pinion gear, said cam structure including bearing rings on which the rail members of each gear assembly ride.

17. The power transmission unit claimed in claim 16 wherein said gear rack assemblies include bearing elements at their ends and reciprocate within said rotor during speed reducing operation of the transmission.

18. The power transmission unit claimed in claim 17 wherein the gear rack assemblies are in perpendicular relationship to one another, the axis of said pinion gear at all times located proximate the intersection of said assemblies, the distance of said intersection from the rotor axis in direct proportion to gear rack assembly travel relative the pinion gear.

* * * * *

UNITED STATES PATENT AND TRADEMARK OFFICE
CERTIFICATE OF CORRECTION

PATENT NO. : 4,411,165
DATED : October 25, 1983
INVENTOR(S) : Lyle B. Evans

It is certified that error appears in the above-identified patent and that said Letters Patent is hereby corrected as shown below:

Sheets 4 and 5 of the patent drawings bearing Figures 12 and 13 have been added as per attached sheets.

Signed and Sealed this

Twenty-second Day of July 1986

[SEAL]

Attest:

DONALD J. QUIGG

Attesting Officer        Commissioner of Patents and Trademarks